United States Patent Office 3,554,907
Patented Jan. 12, 1971

3,554,907
BASIC ALUMINUM SALT FOAMS
Earl P. Moore, Jr., Wilmington, Del., assignor to E. I. du Pont de Nemours and Company, Wilmington, Del.
No Drawing. Continuation-in-part of application Ser. No. 692,730, Jan. 22, 1968, which is a continuation-in-part of application Ser. No. 535,734, Mar. 21, 1966, which in turn is a continuation-in-part of application Ser. No. 442,806, Mar. 25, 1965. This application May 16, 1969, Ser. No. 825,387
Int. Cl. A62d *1/00;* B01j *13/00*
U.S. Cl. 252—3
18 Claims

ABSTRACT OF THE DISCLOSURE

Aqueous compositions having a pH of from 3.5 to 7 and comprising from 2 to 40 percent by weight of water dispersible polymeric aluminum compounds such as basic alumnium chloride and from .02 to 4 percent by weight of anionic organic acid compounds containing from 6 to 18 carbon atoms per acid group such as sodium lauryl sulfate, can be foamed to produce stable, essentially inorganic foams.

CROSS-REFERENCE TO RELATED APPLICATIONS

This application is a continuation-in-part of my copending application Ser. No. 692,730, filed Jan. 22, 1968, now abandoned, which in turn was a continuation-in-part of my copending application Ser. No. 535,734, filed Mar. 21, 1966, now abandoned, which in turn was a continuation-in-part of my then copending application Ser. No. 442,806, filed Mar. 25, 1965, now abandoned.

BACKGROUND OF THE INVENTION

This invention relates to inorganic foams and more particularly is directed to foamable aqueous compositions having a pH of 3.5 to 7 and comprising from 2 to 40 percent by weight of water dispersible polymeric basic aluminum salts and from 0.02 to 4 percent by weight of anionic organic acid compounds containing from 6 to 18 carbon atoms per acid group, and to the aqueous foams and dried foams which are produced from the foamable compositions.

Foam systems known to the art are primarily organic systems such as "soap" foams which collapse upon drying or organic polymer foams which require considerable technology to be used successfully and are limited in their field of use. Other primarily organic systems such as disclosed in U.S. Pat. No. 2,212,470 can contain only small amounts of alumina and must contain large amounts of organic components. Inorganic foam systems such as disclosed in U.S. Pat. No. 3,041,190 are also of limited utility in that they can contain no more than a few percent of alumina at a pH of above 6 and require an expensive alumina starting material. U.S. Pat. No. 2,382,732 also discloses primarily inorganic foams but requires formation of aluminum hydroxide in situ and discloses only saponine as a suitable foam former.

I have discovered an essentially inorganic foam system which is very inexpensive to produce, is quite stable upon drying, is capable of a variety of uses and can contain up to 40 percent or more of basic aluminum salt compound even at a pH as high as 6.

SUMMARY OF THE INVENTION

In summary this invention is directed to foamable aqueous compositions having a pH of from 3.5 to 7 and comprising from 2 to 40 percent by weight of water dispersible polymeric basic aluminum salts and from 0.02 to 4 percent by weight of an anionic organic acid compound containing from 6 to 18 carbon atoms per acid group. This invention is also directed to the aqueous foams and dried foams which can be produced from these foamable compositions.

The foams of this invention provide economical essentially inorganic foams which are quite stable and suited for a wide variety of uses such as thermal and acoustical insulation and as fire-fighting foams.

DESCRIPTION OF THE INVENTION

The aqueous foamable compositions of this invention are prepared by merely mixing the polymeric basic aluminum salt with the organic acid compound in an aqueous medium. The order of admixture is not critical but it is often most convenient to prepare a sol of the basic aluminum salt and then disperse in it the organic acid compound.

The basic aluminum compounds suitable for use in this invention are called polymeric because in solution at pH's below 7 the aluminum compounds polymerize into molecules approaching colloidal size. These basic aluminum compounds can be represented by the chemical formula $$Al_2(OH)_xZ_y$$

where $x$ and $y$ are positive integers, $x+y=6$ and Z is an acid anion such as chloride, nitrate, sulfate, phosphate, formate, acetate and so on.

Representative of suitable basic aluminum compounds is basic aluminum chloride $$Al_2(OH)_5Cl$$

which polymerizes to form compounds such as $$Al_8(OH)_{20}Cl_4$$

Other suitable basic aluminum compounds are basic aluminum formate, basic aluminum acetate, basic aluminum sulfamate, basic aluminum nitrate, basic aluminum hydroxyacetate, basic aluminum sulfate, basic aluminum phosphate and basic aluminum carbonate to name a few. These compounds can be prepared by ion exchanging or electrolyzing the corresponding aluminum salt, or by dissolving aluminum metal in the appropriate aluminum salt or acid solution, or by partially neutralizing the corresponding acid solution.

A preferred basic aluminum salt is basic aluminum chloride also referred to as "Chlorohydrol" and aluminum chlorohydroxide.

The foam coactants suitable for use in this invention are anionic organic acid compounds which contain from 6 to 18 carbon atoms per acid group.

Representative of the organic acid compounds which are suitable for use as foam coactants in the compositions of this invention are compounds of the following formulae:

(1)

wherein
$R_1$, $R_2$ and $R_3$ are the same or different and are
  (a) hydrogen,
  (b) straight chain aliphatic, branched aliphatic or alicyclic, or
  (c) any of (b) containing one unsaturation, provided that $R_1$ can be joined with $R_2$ or $R_3$ to form an alicyclic group which can also contain one unsaturation;

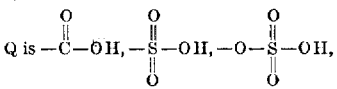

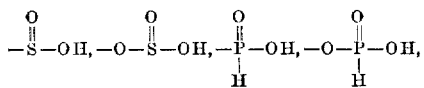

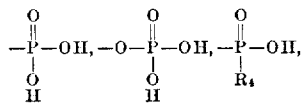

or

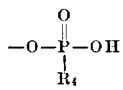

wherein $R_4$ is

with $R_1$, $R_2$ and $R_3$ the same as above, with the limitation that $R_4$ can contain between 1 and 10 carbon atoms; and the sulfate and phosphate esters of (a) esters of the above acids and polyfunctional alcohols or thioalcohols or (b) amides of the above acids and aminoalcohols; with the limitation that the compound must contain between 6 and 18 carbon atoms per acid group.

(2)
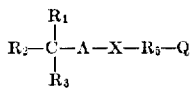

wherein $R_1$, $R_2$ and $R_3$ are as in Formula 1, A is

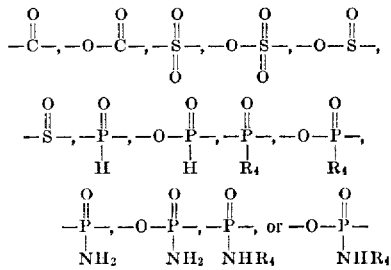

wherein
$R_4$ is as in Formula 1; X is —NH—, —NR$_4$—, —O—, or —S—, wherein $R_4$ is as in Formula 1; $R_5$ is straight or branched aliphatic or alicyclic of 2 to 10 carbon atoms which can contain up to one hydroxyl, sulfate or phosphate radical per carbon atom; and Q is as in Formula 1; with the limitation that the compound must contain between 6 and 18 carbon atoms per acid group.

The salts and mixtures of the compounds of Formulae 1 and 2 are also effective as foam coactants. Typical salts are the sodium, ammonium, potassium, lithium and organic amine salts.

Where the organic acid is polyfunctional it can contain multiples of the number of carbon atoms as is represented by compounds of the following formula:

(3)                Q—R$_6$—Q$_1$ wherein

Q and Q$_1$ can be the same or different and can be any of the acid groups of Q in Formula 1; and R$_6$ is straight or branched aliphatic or alicyclic which can contain one unsaturation; with the limitation that R$_6$ must contain from 10 to 36 carbon atoms; amides of the above compounds; sulfate and phosphate acid esters of (a) esters of the above acids and polyfunctional alcohols or thioalcohols; or (b) amides of the above acids and aminoalcohols.

As with the compounds of Formulae 1 and 2, the salts and mixtures of the above compounds are suitable for use as foam coactants.

In some compounds the actual number of carbon atoms will exceed 18 per acid group. This is so because the coactant effect is apparent in compounds of Formula 4 below. It appears in such structures that the aromatic ring structure behaves not as six carbons but more as two carbons in the ratio of total carbons to acid group.

(4)
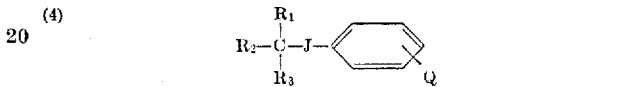

wherein $R_1$, $R_2$ and $R_3$ are as in Formula 1;
J is —CH$_2$—, —O—, —S—, —NH—,

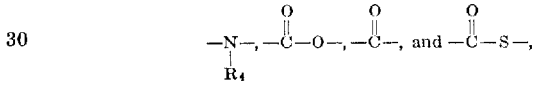

wherein $R_4$ is as in Formula 1; and Q is as in Formula 1.

As with the compounds of Formulae 1, 2 and 3, the salts and mixtures of the above compounds are also effective foam coactants.

Particular acid compounds which have been found to form suitable foams in accordance with this invention include salts of amides of 6 to 18 carbon fatty acids and hydrolyzed protein acids such as "Maypon UD" sodium undecylenyl polypeptidate, and "Maypon 4C" potassium cocoyl polypeptidate; straight chain saturated and unsaturated carboxylic acids such as hexanoic, heptanoic, octanoic, nonanoic, decanoic, undecanoic, dodecanoic, tridecanoic, tetradecanoic, pentadecanoic, hexadecanoic, heptadecanoic, octadecanoic, their mixtures, and their unsaturated counterparts, as well as other unsaturated acids such as oleic and 10 undecylenic; mixed branched-chain 6 to 18 carbon carboxylic acids such as neo-pentanoic, neo-heptanoic, neo-decanoic, neo-tridecanoic, and substituted acids such as perfluorooctanoic and omega H perfluorooctanoic acid; salts of the above acids such as the ammonium, sodium, potassium, lithium and organic amine salts; aromatic compounds such as long-chain alkyl benzene sulfonic acids including octyl benzene sulfonic acid, hexadecyl benzene sulfonic acid, dodecyl benzene sulfonic acid, and their ammonium, sodium, potassium, lithium and organic amine salts; other carboxylic acids such as p-octyl benzoic acid, and their ammonium, sodium, potassium, lithium and organic amine salts; and other compounds including ammonium, sodium, potassium, lithium and organic amine salts of esters of long chain 6 to 18 carbon monohydric alcohols such as hexanol, octanol, decanol, tetradecanol, hexadecanol, or octadecanol, and phosphoric or sulfuric acid, i.e., "Duponol"® C, sodium lauryl sulfate, "Duponol"® AM ammonium lauryl sulfate, and "Duponal"® EL triethanol amine lauryl sulfate; and such compounds as cyclohexyl butyric acid; 10-hydroxydecanoic acid; "Maprosyl" 30 sodium lauroyl sarcosinate; 9-ethyl-eicosan-1,20-dioic acid; sodium pentachlorophenate; "Zonyl" S–13 mixed fluoroalkyl phosphate; dioctyl sodium sulfosuccinate; chlorendic acid; and "Zelec" UN fatty alcohol phosphate.

The organic amines referred to above as forming suitable salts with various acids are the amines of the formula

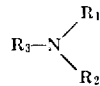

wherein $R_1$, $R_2$ and $R_3$ are the same or different and are hydrogen, methyl, ethyl, or 2-ethanol.

Representative of suitable organic amine salts are methylammonium dodecylbenzene sulfonate, diethylammonium decanoate, 2-ethanolammonium tetradecanoate, tris(2-ethanol) ammonium p-octylbenzoate, 2-ethanolammonium dodecyl sulfate, triethylammonium tetradecyl sulfate, methylethylammonium decyl sulfate, bis(2-ethanol) ammonium dioctyl phosphate, and bis(trimethylammonium)hexadecyl phosphate.

Preferred foam coactants for reasons of most desirable foam consistency are those containing 8 to 16 carbon atoms per acid group such as octanoic, decanoic, nonanoic, undecanoic, dodecanoic, tridecanoic, tetradecanoic, pentadecanoic, 10-undecylenic, neo-decanoic, neo-tridecanoic, heptadecafluorooctanoic, omega-H-heptadecafluorooctanoic, dodecylbenzene sulfonic, p-octylbenzoic and cyclohexyl butyric acids and their ammonium, sodium, potassium, lithium and organic amine salts, sodium lauroyl sarcosinate, dioctyl sodium sulfosuccinate, "Maypon" UD sodium undecylenyl polypeptidate, "Maypon" 4C potassium cocoyl polypeptidate, and esters of long-chain monohydric alcohols and sulfuric or phosphoric acids and their salts. The term "long-chain" as used above is intended to include alkyl of 6 or more carbon atoms. Where substituted compounds are mentioned the substituents are not critical as to kind or number.

The coaction between the above acid compounds and the water dispersible, basic aluminum salt in an aqueous composition is not fully understood, however, some interaction between the components permits for generation of foams which have exceptional stability and controlled draining properties as compared to organic foams as soap foams.

The amount of basic aluminum salt used in the compositions of this invention will range generally from about 2 to about 40 weight percent of the total composition. Amounts of basic aluminum salt of less than 2% can be used to produce a foam but the consistency is such that it is not generally as stable as foams containing more than 2%. Amounts of aluminum salt in excess of 40 percent can likewise be used and amounts from about 40 to 50 percent are only a little less desirable than foams containing less than 40 percent of basic aluminum salt. Amounts of more than 50 percent tend to make the aqueous composition too thick for preparation of a stable foam.

An amount of basic aluminum salt of from about 5 to 30 weight percent based on the weight of the total composition is preferred as such amounts tend to produce a foam which has the most desirable combination of properties.

As previously stated, the organic acid compound will be used in amounts ranging from .02 to 4 weight percent. The amount is determined by the amount of basic aluminum compound that is used. The organic acid compound is used in amounts of from 1 to 10 percent by weight based on the amount of basic aluminum compound used. Less than 1 percent based on the weight of aluminum salt can be used in the compositions of this invention but the qualitiy of the foams tends to decrease with lower amounts of acid compound. Amounts in excess of 10 percent, based on the aluminum compound, can be used without any marked decrease in foaming effectiveness, however, since no apparent benefit is derived from the use of larger amounts of acid compound, amounts in excess of 10 percent are considered superfluous.

Additives which can be used in the compositions of this invenition are numerous. Generally speaking, any additive is suitable which does not tend to collapse the aqueous foams.

As the ratios of components permit for wide variance in the amounts of each component which can be present, it is possible to obtain a composition with a high or low pH. While such compositions can be used to produce stable foams, it is preferred to adjust the pH to a range of 3.5 to 7 prior to foaming and for best results it is preferred that the pH be in the range of 4.5 to 6.0. It is usually desirable to make the pH adjustment initially on the basic aluminum salt sol by either bringing it to a neutral pH or to that pH which is desired.

The pH adjustment can be made by adding dilute alkalis such as ammonium hydroxide, sodium hydroxide, potassium hydroxide or lithium hydroxide as required. Aqueous solutions of such water soluble organic amines as triethanolamine can also be used. An alternate means of adjusting the pH is ion exchange or partial deionization of the basic aluminum salt sol.

For convenient use the foamable compositions of this invention will sometimes be packaged in pressurized containers traditionally used for such products. The metal or plastic containers suitable for such use are well known in the art.

Similarly, the propellants suitable for use in such packaged compositions are those traditionally used, such as alkanes and halogenated alkanes. The selection of propellants suitable for use in such packages is made on the basis of such consideration as safety and toxicity and are well known to those skilled in the art.

Other methods of foaming the aqueous foamable compositions of this invention will be readily apparent to one skilled in the art. For example, the compositions can be foamed mechanically with vigorous agitation from beater type mixers, blender type mixers or commercial foam producers.

In order that this invention can be better understood the following illustrative examples are given wherein parts and percentages are by weight unless otherwise noted.

EXAMPLE 1

A solution of 320 grams of basic aluminum chloride is mixed with 480 grams of water to give a solution of 20% solids. The basic aluminum chloride is a 50% solution of chlorohydrol sold commercially by the Reheis Chemical Co. Washed Rexyn 201 (OH) basic ion exchange resin is stirred in to bring the pH to 6.00. To 391 grams of this solution, there is added 19.5 milliliters of a 20% Duponal C solution. This mixture is placed in a Waring Blendor for mixing. It is then transferred to a 4 liter Hobart mixer and stirred using a wire stirrer until a heavy, smooth, creamy foam is obtained.

EXAMPLE 2

A mixture of 160 grams of a 50% chlorohydrol solution and 240 grams of water is prepared. The mixture contains 20% solids and has a pH of 4.15. The mixture is stirred in a blender as 10 milliliters of 20% Dupanol C are added. Foaming begins, but the mixture is transferred to a Hobart kettle and there is stirred until a light very fine foam is obtained.

EXAMPLE 3

A 20% solution of chlorohydrol is adjusted to pH 5.00 with dilute ammonium hydroxide solution. Ten milliliters of 20% Duponal C are added to 400 grams of the chlorohydrol solution. This is transferred to a Hobart kettle, stirred on speed No. 2, then switched to speed No. 3. A full kettle of light bodied foam is obtained.

EXAMPLE 4

A solution of 51.7 grams of $Al(NO_3)_3 \cdot 9H_2O$ is added to 115 milliliters of water in a Waring Blendor and 22.0 milliliters of 28% ammonium hydroxide solution is then added, dropwise. The resulting solution is cooled to 20° C., and 14.5 ml. of a 4% ammonium hydroxide solution is then added, dropwise. At this point, the viscosity of the mixture is just beginning to increase, and the mixture appears somewhat thixotropic. With good stirring, 50 ml. of 5% aqueous Methocel MC 400 is added, followed by a solution of 0.10 grams perfluorooctanoic acid in 3 ml. of isopropanol. The mixture is whipped with a hand-held mixer to about 600 ml. of thick, strong, low density foam.

I claim:

1. Foamable aqueous compositions having a pH of from 3.5 to 7 and containing as essential ingredients water, from 2 to 40 percent by weight of a polymeric basic aluminum salt containing recurring groups of the formula $$Al_2(OH)_xZ_y$$

wherein $x$ and $y$ are positive integers;
$x+y=6$; and
$Z$ is an acid anion;

and from 1 to 10 percent by weight based on the weight of basic aluminum salt of an anionic organic acid compound selected from the group consisting of saturated and unsaturated, straight chain, 6 to 18 carbon carboxylic acids; mixed, branched chain, 6 to 18 carbon carboxylic acids; alkyl benzene sulfonic acids in which the alkyl groups contain 6 to 18 carbon atoms; heptadecafluorooctanoic acid; omega-H-heptadecafluorooctanoic acid; p-octylbenzoic acid; cyclohexylbutyric acid; chlorendic acid; 10-hydroxydecanoic acid; 9-ethyl-eicosan-1,20-dioic acid; mixtures of these acids; their ammonium, sodium, potassium, lithium and organic amine salts wherein the organic amine is of the formula

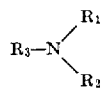

wherein $R_1$, $R_2$, and $R_3$ are the same or different and are hydrogen, methyl, ethyl, or 2-ethanol;

the ammonium, sodium, potassium, lithium and organic amine salts of amides 6 to 18 carbon fatty acids and hydrolyzed protein acids wherein the organic amines are as defined above; the ammonium, sodium, potassium, lithium and organic amine salts of esters of long-chain 6 to 18 carbon monohydric alcohols and sulfuric or phosphoric acid wherein the organic amines are as defined above; sodium lauroyl sarcosinate; dioctyl sodium sulfosuccinate; or sodium pentachlorophenate.

2. A composition of claim 1 wherein the basic aluminum salt is present in amounts ranging from 5 to 30 percent by weight.

3. A composition of claim 1 wherein the organic acid compound is octanoic acid; nonanoic acid; decanoic acid; undecanoic acid; dodecanoic acid; tridecanoic acid; tetradecanoic acid; pentadecanoic acid; 10 undecenylic acid; heptadecafluorooctanoic acid; omega-H-heptadecafluorooctanoic acid; p-octylbenzoic acid; dodecylbenzene sulfonic acid; cyclohexylbutyric acid; their mixtures; or their ammonium, sodium, potassium, lithium, or organic amine salts wherein the organic amine is of the formula

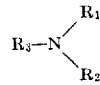

wherein $R_1$, $R_2$, and $R_3$ are the same or different and are hydrogen, methyl, ethyl, or 2-ethanol;

the ammonium, sodium, potassium, lithium and organic amine salts of amides 8 to 6 carbon fatty acids and hydrolyzed protein acids wherein the organic amines are as defined above; the ammonium, sodium, potassium, lithium, or organic amine salts of esters of long-chain 8 to 16 carbon monohydric alcohols and sulfuric or phosphoric acid, wherein the organic amines are as defined above; sodium lauroyl sarcosinate; or dioctyl sodium sulfosuccinate.

4. A composition of claim 1 in which the basic aluminum salt is basic aluminum chloride.

5. A composition of claim 3 in which the basic aluminum salt is present in amounts ranging from 5 to 30 percent by weight.

6. A composition of claim 3 in which the basic aluminum salt is basic aluminum chloride.

7. A composition of claim 6 in which the basic aluminum chloride present in amounts ranging from 5 to 30 percent by weight.

8. An aqueous foam containing as essential ingredients water, from 2 to 40 percent by weight of a polymeric basic aluminum salt containing recurring groups of the formula $$Al_2(OH)_xZ_y$$

wherein $x$ and $y$ are positive integers;
$x+y=6$; and
$Z$ is an acid anion;

and from 1 to 10 percent by weight based on the weight of basic aluminum salt of an anionic organic acid compound selected from the group consisting of saturated and unsaturated, straight chain, 6 to 18 carbon carboxylic acids; mixed, branched chain, 6 to 18 carbon carboxylic acids; alkyl benzene sulfonic acids in which the alkyl groups contain 6 to 18 carbon atoms; heptadecafluorooctanoic acid; omega-H-heptadecafluorooctanoic acid; p-octylbenzoic acid; cyclohexylbutyric acid; chlorendic acid; 10-hydroxydecanoic acid; 9-ethyl-eicosan-1,20-dioic acid; mixtures of these acids; their ammonium, sodium, potassium, lithium and organic amine salts wherein the organic amine is of the formula

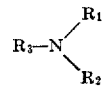

wherein $R_1$, $R_2$, and $R_3$ are the same or different and are hydrogen, methyl, ethyl, or 2-ethanol;

the ammonium, sodium, potassium, lithium and organic amine salts of amides 6 to 18 carbon fatty acids and hydrolyzed protein acids wherein the organic amines are as defined above; the ammonium, sodium, potassium, lithium and organic amine salts of esters of long-chain 6 to 18 carbon monohydric alcohols and sulfuric or phosphoric acid wherein the organic amines are as defined above; sodium lauroyl sarcosinate; dioctyl sodium sulfosuccinate; or sodium pentachlorophenate.

9. A foam of claim 8 wherein the basic aluminum salt is present in amounts ranging from 5 to 30 percent by weight.

10. A foam of claim 8 wherein the organic acid compound is octanoic acid; nonanoic acid; decanoic acid; undecanoic acid; dodecanoic acid; tridecanoic acid; tetradecanoic acid; pentadecanoic acid; 10 undecylenic acid; heptadecafluorooctanoic acid; omega-H-heptadecafluorooctanoic acid; p-octylbenzoic acid; dodecylbenzene sulfonic acid; cyclohexylbutyric acid; their mixtures; or their ammonium, sodium, potassium, lithium, or organic amine salts wherein the organic amine is of the formula

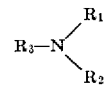

wherein $R_1$, $R_2$, and $R_3$ are the same or different and are hydrogen, methyl, ethyl or 2-ethanol;

the ammonium, sodium, potassium, lithium or organic amine salts of amides of 8 to 16 carbon fatty acids and hydrolyzed protein acids, wherein the organic amines are as defined above; the ammonium, sodium, potassium, lithium, or organic amine salts of esters of long-chain 8 to 16 carbon monohydric alcohols and sulfuric or phosphoric acid, wherein the organic amines are as defined above; sodium lauroyl sarcosinate; or dioctyl sodium sulfosuccinate.

11. A foam of claim 8 wherein the basic aluminum salt is basic aluminum chloride.

12. A foam of claim 10 in which the basic aluminum salt is present in amounts ranging from 5 to 30 percent by weight.

13. A foam of claim 10 in which the basic aluminum salt is basic aluminum chloride.

14. A foam of claim 13 in which the basic aluminum chloride is present in amounts ranging from 5 to 30 percent by weight.

15. A foam containing as essential ingredients a polymeric basic aluminium salt containing recurring groups of the formula $$Al_2(OH)_xZ_y$$

wherein $x$ and $y$ are positive integers;

$x+y=6$; and

Z is an acid anion;

and from 1 to 10 percent based on the weight of the aluminum salt of an anionic organic acid compound selected from the group consisting of saturated and unsaturated, straight chain, 6 to 18 carbon carboxylic acids; mixed, branched chain, 6 to 18 carbon carboxylic acids; alkyl benzene sulfonic acids in which the alkyl groups contain 6 to 18 carbon atoms; heptadecafluorooctanoic acid; omega-H-heptadecafluorooctanoic acid; p-octylbenzoic acid; cyclohexylbutyric acid; chlorendic acid; 10-hydroxydecanoic acid; 9-ethyl-eicosan-1,20-dioic acid; mixtures of these acids; their ammonium, sodium, potassium, lithium and organic amine salts wherein the organic amine is of the formula

wherein $R_1$, $R_2$, and $R_3$ are the same or different and are hydrogen, methyl, ethyl, or 2-ethanol;

the ammonium, sodium, potassium, lithium and organic amine salts of amides of 6 to 18 carbon fatty acids and hydrolyzed protein acids wherein the organic amines are as defined above; the ammonium, sodium, potassium, lithium and organic amine salts of esters of long-chain 6 to 18 carbon monohydric alcohols and sulfuric or phosphoric acid wherein the organic amines are as defined above; sodium lauroyl sarcosinate; dioctyl sodium sulfosuccinate; or sodium pentachlorophenate.

16. A foam of claim 15 wherein the basic aluminum compound is basic aluminum chloride.

17. A foam of claim 15 wherein the organic acid compound is octanoic acid; nonanoic acid; decanoic acid; undecanoic acid; dodecanoic acid; tridecanoic acid; tetradecanoic acid; pentadecanoic acid; 10 undecylenic acid; heptadecafluorooctanoic acid; omega-H-heptadecafluorooctanoic acid; p-octylbenzoic acid; dodecylbenzene sulfonic acid; cyclohexylbutyric acid; their mixtures; or their ammonium, sodium, potassium, lithium, or organic amine salts wherein the organic amine is of the formula

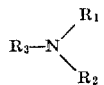

wherein $R_1$, $R_2$ and $R_3$ are the same or different and are hydrogen, methyl, ethyl or 2-ethanol;

the ammonium, sodium, potassium, lithium or organic amine salts of amides of 8 to 16 carbon fatty acids and hydrolyzed protein acids, wherein the organic amines are as defined above; the ammonium, sodium, potassium, lithium, or organic amine salts of esters of long-chain 8 to 16 carbon monohydric alcohols and sulfuric or phosphoric acid, wherein the organic amines are as defined above; sodium lauroyl sarcosinate; or dioctyl sodium sulfosuccinate.

18. A foam of claim 17 wherein the basic aluminum compound is basic aluminum chloride.

References Cited

UNITED STATES PATENTS

| 2,114,042 | 4/1938 | Bertsch | 260—99.12 |
|---|---|---|---|
| 2,193,541 | 3/1940 | Timpson | 252—3 |
| 2,212,470 | 8/1940 | Friedrich | 252—3 |
| 2,382,732 | 8/1945 | Lowenstein | 252—307 |
| 2,915,475 | 12/1959 | Bugosh | 252—313 |
| 2,952,695 | 9/1960 | Stedehouder | 260—448X |
| 2,992,262 | 7/1961 | Sears et al. | 260—448 |
| 2,987,474 | 6/1961 | Wilson et al. | 252—8.6 |
| 3,031,418 | 4/1962 | Bugosh | 252—8.6X |
| 3,041,190 | 6/1962 | Griffith et al. | 106—40 |
| 3,207,578 | 9/1965 | Brown et al. | 252—313X |

JOHN T. GOOLKASIAN, Primary Examiner

D. J. FRITSCH, Assistant Examiner

U.S. Cl. X.R.

106—40; 252—152, 161, 307, 313

PO-1050
(5/69)

UNITED STATES PATENT OFFICE
CERTIFICATE OF CORRECTION

Patent No. 3,554,907      Dated January 12, 1971

Inventor(s) Earl P. Moore, Jr.

It is certified that error appears in the above-identified patent and that said Letters Patent are hereby corrected as shown below:

In Claim 1: Column 7, line 45, following the term "amides" insert the word -- of --;

In Claim 3: Column 7, line 73, following the term "amides" insert the word -- of --;

Column 7, line 73, delete the numeral "6" and insert in place thereof -- 16 --;

In Claim 7: Column 8, line 14, following the term "chloride" insert the term -- is --;

In Claim 8: Column 8, line 45, following the term "amides" insert the term -- of --.

Signed and sealed this 20th day of April 1971.

(SEAL)
Attest:

EDWARD M. FLETCHER, JR.
Attesting Officer

WILLIAM E. SCHUYLER, JR.
Commissioner of Patents